(12) United States Patent
Reynolds

(10) Patent No.: US 8,939,591 B1
(45) Date of Patent: Jan. 27, 2015

(54) COMBINED MIRROR AND SAFETY SIGNAL SYSTEM

(71) Applicant: Therese M. Reynolds, Fort Meyers, FL (US)

(72) Inventor: Therese M. Reynolds, Fort Meyers, FL (US)

( * ) Notice: Subject to any disclaimer, the term of this patent is extended or adjusted under 35 U.S.C. 154(b) by 188 days.

(21) Appl. No.: 13/737,311

(22) Filed: Jan. 9, 2013

(51) Int. Cl.
*G02B 7/182* (2006.01)

(52) U.S. Cl.
CPC ...................................... *G02B 7/182* (2013.01)
USPC ............................................. 359/880; 116/20

(58) Field of Classification Search
USPC ............................................. 359/880; 116/20
See application file for complete search history.

(56) References Cited

U.S. PATENT DOCUMENTS

| | | | |
|---|---|---|---|
| 1,345,157 A | 6/1920 | Francisco | |
| 2,091,203 A | 8/1937 | Hay | |
| 3,164,124 A * | 1/1965 | Ehrsam | 116/20 |
| 3,335,693 A * | 8/1967 | Murray, Jr. | 116/20 |
| 3,515,365 A | 6/1970 | Jones et al. | |
| 4,896,954 A | 1/1990 | Swanson | |
| D331,383 S | 12/1992 | Kanno | |
| 5,259,582 A | 11/1993 | DeLange, III | |
| 5,453,915 A | 9/1995 | Bradley, III | |
| 5,777,810 A * | 7/1998 | Murray, Jr. | 359/883 |
| 6,132,051 A | 10/2000 | Morell et al. | |

* cited by examiner

*Primary Examiner* — Jennifer L. Doak

(57) ABSTRACT

The present invention features a combined mirror and safety signal system for boats or other vehicles. The system features a housing having a housing anterior surface and a housing posterior surface. A magnet is located on the housing anterior surface and a mounting bracket is located on the housing posterior surface. The system has a removable mirror unit having a mirror unit anterior surface and a mirror unit posterior surface. A mirror is inset into a mirror unit anterior surface. A magnet is inset into a mirror unit posterior surface. A lanyard is located on the mirror unit. The housing is mounted on a boat or other vehicle via the mounting bracket. The mirror unit posterior surface magnetically connects to the housing anterior surface to hold the mirror unit in place on the housing.

3 Claims, 4 Drawing Sheets

COMBINED MIRROR AND SAFETY SIGNAL SYSTEM

BACKGROUND OF THE INVENTION

Heliographs, or signaling mirrors, have been in use since the 1800s as a wireless solar telegraph that emits signals using flashes of sunlight reflected by a mirror. A signaling mirror can be especially useful during an emergency situation during daylight hours such as a boating emergency. The present invention features a combined mirror and safety signal system for boats or other vehicles.

SUMMARY

The present invention features a combined mirror and safety signal system for boats or other vehicles. In some embodiments, the system comprises a housing having a housing anterior surface and a housing posterior surface. In some embodiments, the housing anterior surface comprises a magnet located thereon. In some embodiments, the housing posterior surface comprises a mounting bracket located thereon.

In some embodiments, the system comprises a removable mirror unit having a mirror unit anterior surface and a mirror unit posterior surface. In some embodiments, a mirror is located on and inset into a mirror unit anterior surface thereon. In some embodiments, a magnet located on and inset into a mirror unit posterior surface thereon. In some embodiments, a lanyard is located on mirror unit.

In some embodiments, the housing is located on the boat or other vehicle via the mounting bracket. In some embodiments, the mirror unit posterior surface magnetically connects to the housing anterior surface to securely attach the mirror unit to the housing.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
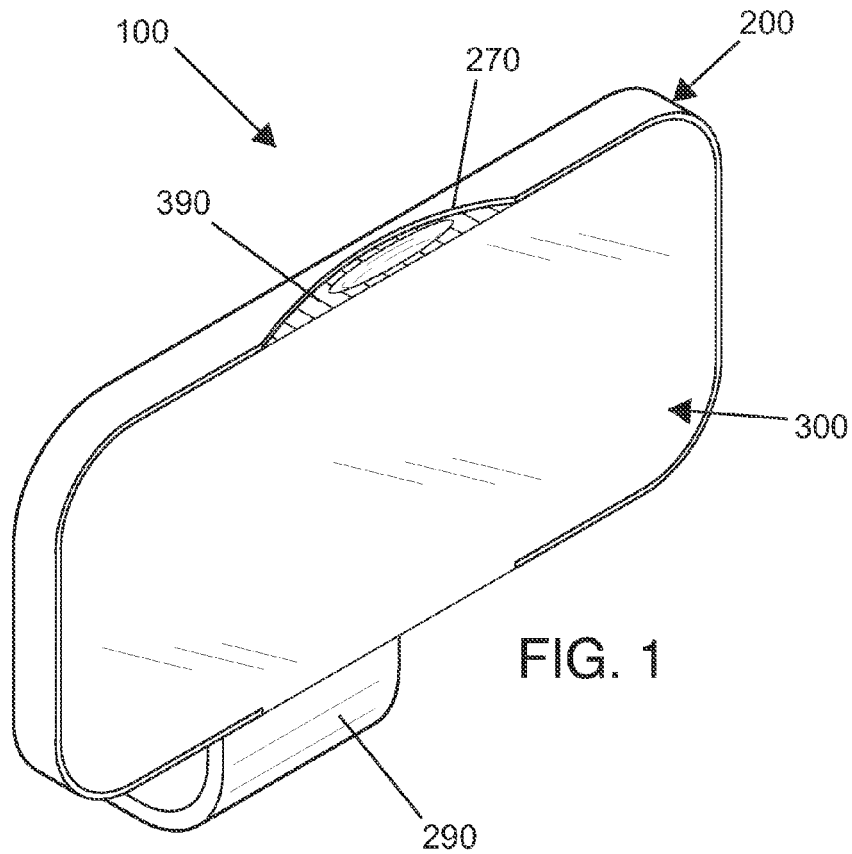
FIG. 1 is a perspective view of the present invention.
Figure 2:
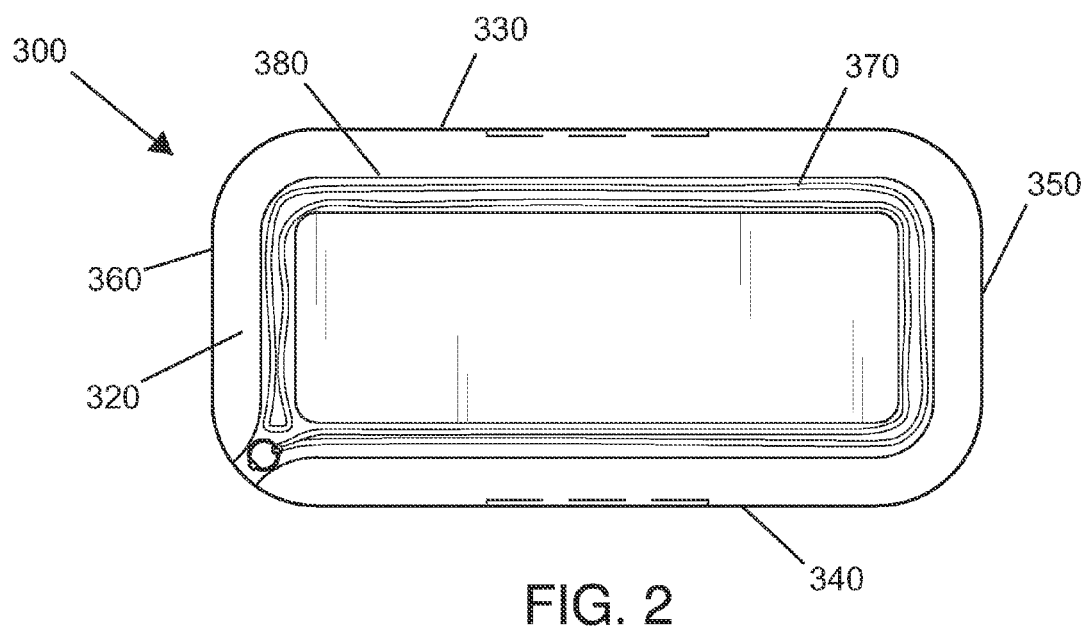
FIG. 2 is a rear view of the removable mirror unit of the present invention.
Figure 3:
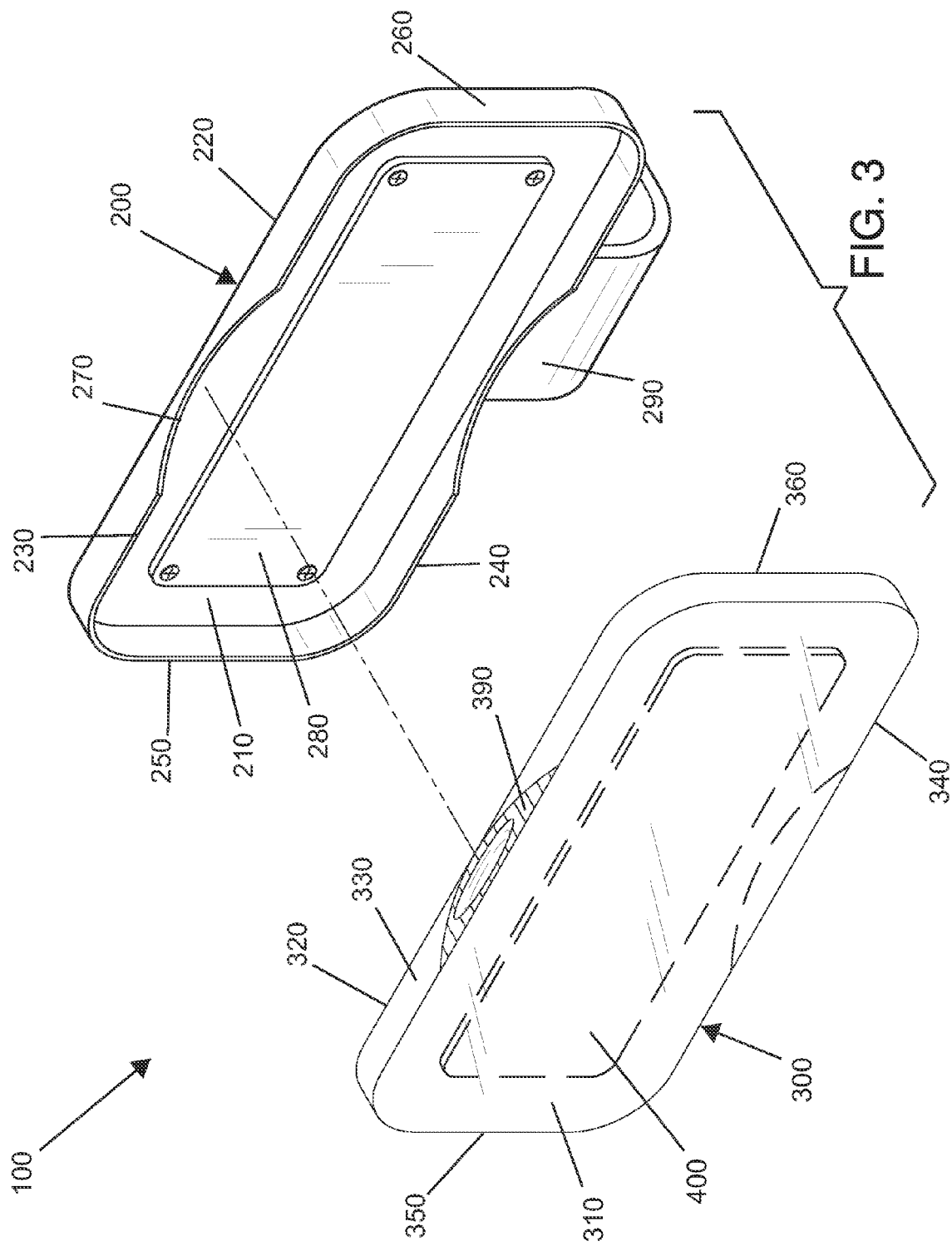
FIG. 3 is an exploded view of the present invention.
Figure 4:
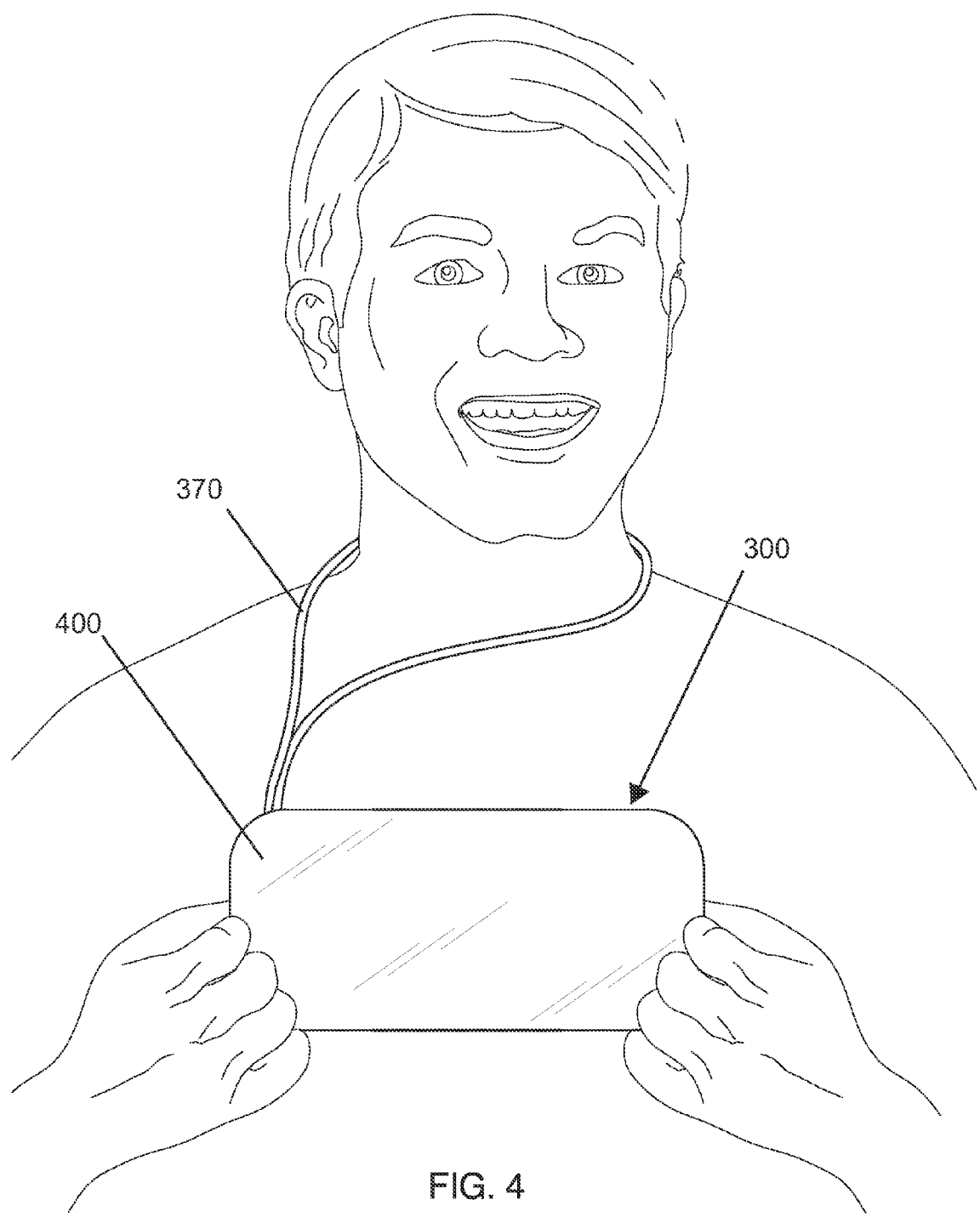
FIG. 4 is a front view of the removable mirror unit of the present invention.
Figure 5:
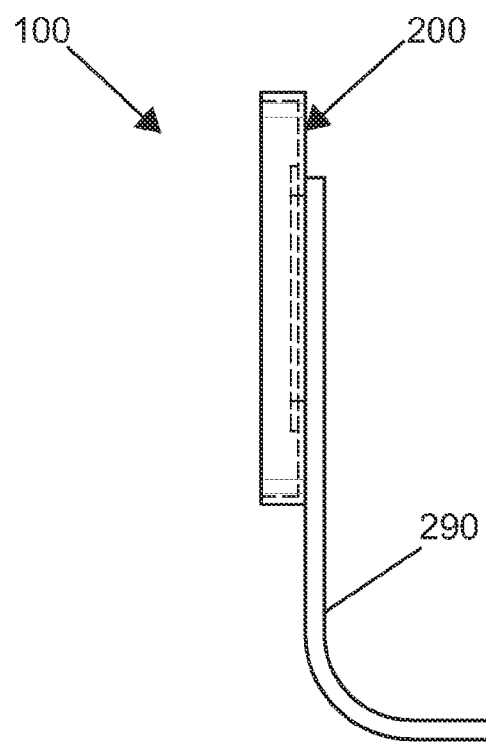
FIG. 5 is a side view of the present invention.
Figure 6:
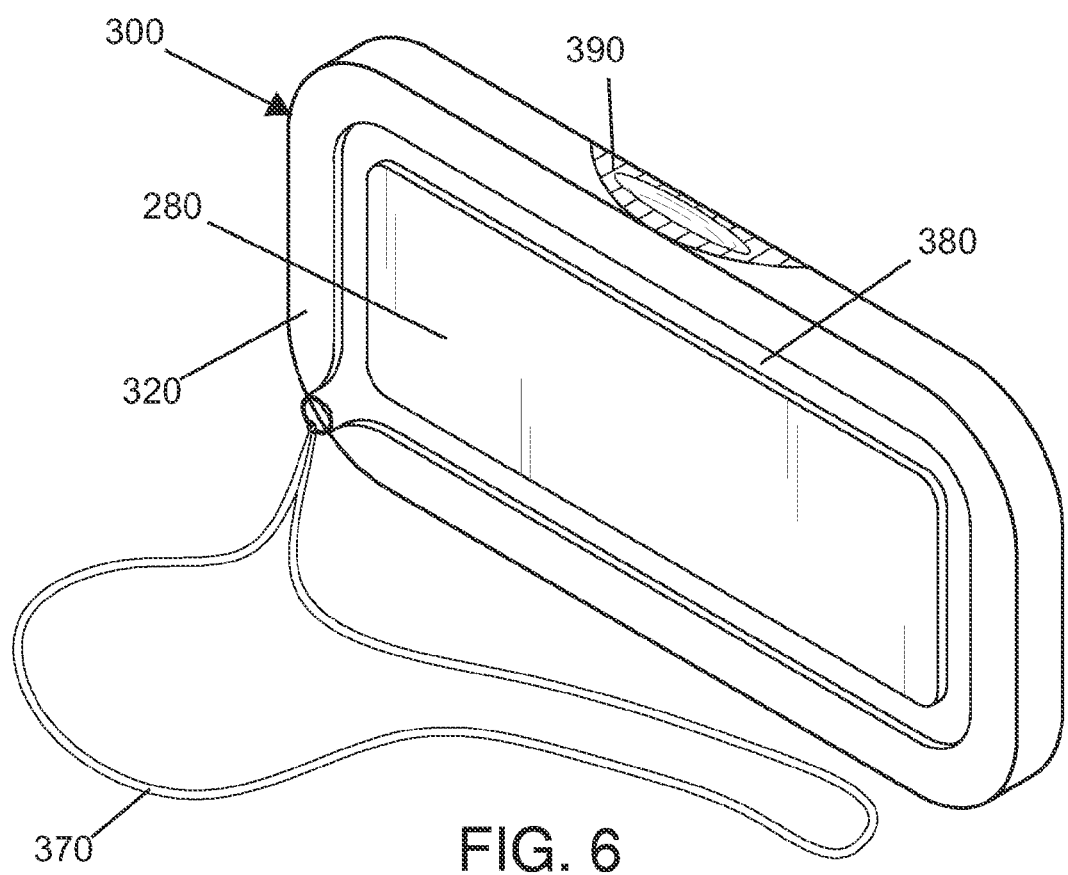
FIG. 6 is a perspective view of the removable mirror unit of the present invention.

Following is a list of elements corresponding to a particular element referred to herein:

100 Mirror and safety signal system
200 Housing
210 Housing anterior surface
220 Housing posterior surface
230 Housing top projecting edge
240 Housing bottom projecting edge
250 Housing first projecting edge
260 Housing second projecting edge
270 Recessed notch
280 Magnet
290 Mounting bracket
300 Removable mirror unit
310 Mirror unit anterior surface
320 Mirror unit posterior surface
330 Mirror unit top edge
340 Mirror unit bottom edge
350 Mirror unit first edge
360 Mirror unit second edge
370 Lanyard
380 Rectangular channel
390 Gripping surface
400 Mirror Referring now to FIG. 1-6, the present invention features a combined mirror and safety signal system (100) for boats or other vehicles. In some embodiments, the system (100) comprises a housing (200) having a housing anterior surface (210) and a housing posterior surface (220). In some embodiments, the housing anterior surface (210) comprises a housing top projecting edge (230), a housing bottom projecting edge (240), a housing first projecting edge (250), and a housing second projecting edge (260) disposed thereon. In some embodiments, the housing top projecting edge (230), the housing bottom projecting edge (240), the housing first projecting edge (250), and the housing second projecting edge (260) perpendicularly project out and away from the housing anterior surface (210). In some embodiments, the housing (200) is made from metal. In some embodiments, the housing (200) is made from plastic.

In some embodiments, the housing top projecting edge (230) and the housing bottom projecting edge (240) each comprise a recessed notch (270) disposed at a midpoint thereon. In some embodiments, the housing anterior surface (210) comprises a magnet (280) centrally disposed thereon. In some embodiments, the magnet (280) is recessed in the housing anterior surface (210). In some embodiments, the magnet (280) is not recessed in the housing anterior surface (210). In some embodiments, the housing posterior surface (220) comprises a mounting bracket (290) disposed thereon for attaching to boats or other vehicles. In some embodiments, the mounting bracket (290) is pivotally mounted on the housing posterior surface (220).

In some embodiments, the system (100) comprises a floating, removable mirror unit (300) having a mirror unit anterior surface (310) and a mirror unit posterior surface (320). In some embodiments, the removable mirror unit (300) comprises a mirror unit top edge (330), a mirror unit bottom edge (340), a mirror unit first edge (350), and a mirror unit second edge (360). In some embodiments, the mirror unit (300) is constructed of plastic, rubber or foam.

In some embodiments, a mirror (400) is disposed on and inset into a mirror unit anterior surface (310) thereon. In some embodiments, the mirror (400) is constructed from glass. In some embodiments, the mirror is constructed from plastic. In some embodiments, a magnet (280) disposed on and inset into a mirror unit posterior surface (320) thereon. In some embodiments, the magnet (280) is not inset. In some embodiments, a lanyard (370) is disposed on removable mirror unit (300). In some embodiments, the lanyard (370) is of such a length to be worn around a neck of a person. In some embodiments, the mirror unit posterior surface (320) comprises a rectangular channel (380) disposed therein for receiving the lanyard (370). In some embodiments, the lanyard (370) is stored in the rectangular channel (380) when not in use. In some embodiments, a gripping surface (390) is disposed on the mirror unit top edge (330) and the mirror unit bottom edge (340). In some embodiments, the gripping surface (390) is rubber. In some embodiments, the gripping surface (390) is textured.

In some embodiments, the housing (200) is disposed on the boat or other vehicle via the mounting bracket (290). In some embodiments, the mirror unit posterior surface (320) magnetically connects to the housing anterior surface (210) for securely attaching the removable mirror unit (300) to the housing (200). In some embodiments, the removable mirror unit (300) is easily removed from its secure resting place in the housing (200) via gripping the gripping surface (390) made visible via the recessed notches (270).

In some embodiments, the mirror unit posterior surface (320) magnetically connects to the housing anterior surface (210) for securely attaching the removable mirror unit (300) to the housing (200) by using a single magnet (280) located either on the mirror unit posterior surface (320) or the housing anterior surface (210) but not both. The opposite surface comprises a metal surface for the magnet to attract.

In some embodiments, the gripping surface (390) comprises flat grips. In some embodiments, the gripping surface (390) comprises an indentation adapted to receive a tip of a fingernail.

As used herein, the term "about" refers to plus or minus 10% of the referenced number. For example, an embodiment wherein the mirror is about 10 inches in length includes a mirror that is between 9 and 11 inches in length.

The disclosures of the following U.S. Patents are incorporated in their entirety by reference herein: U.S. Pat. No. 1,345,157; U.S. Pat. No. 2,091,203; U.S. Pat. No. 3,515,365; U.S. Pat. No. 4,896,954; U.S. Pat. No. 5,259,582; U.S. Pat. No. 5,453,915; U.S. Pat. No. 6,132,051; and U.S. Pat. No. D 331,383.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A combined mirror and safety signal system (100) for boats or other vehicles, wherein said system (100) comprises:

(a) a housing (200) having a housing anterior surface (210) and a housing posterior surface (220), wherein the housing anterior surface (210) comprises a housing top projecting edge (230), a housing bottom projecting edge (240), a housing first projecting edge (250), and a housing second projecting edge (260) disposed thereon, wherein the housing top projecting edge (230), the housing bottom projecting edge (240), the housing first projecting edge (250), and the housing second projecting edge (260) perpendicularly project out and away from the housing anterior surface (210), wherein the housing top projecting edge (230) and the housing bottom projecting edge (240) each comprise a recessed notch (270) disposed at a midpoint thereon, wherein the housing anterior surface (210) comprises a magnet (280) centrally disposed thereon, wherein the housing posterior surface (220) comprises a mounting bracket (290) disposed thereon for attaching to boats or other vehicles; and (b) a floating, removable mirror unit (300) having a mirror unit anterior surface (310) and a mirror unit posterior surface (320), wherein the removable mirror unit (300) comprises a mirror unit top edge (330), a mirror unit bottom edge (340), a mirror unit first edge (350), and a mirror unit second edge (360), wherein a mirror (400) is disposed on and inset into the mirror unit anterior surface (310) thereon, wherein a second magnet (280) disposed on and inset into the mirror unit posterior surface (320) thereon, wherein a lanyard (370) is disposed on the removable mirror unit (300), wherein the mirror unit posterior surface (320) comprises a rectangular channel (380) disposed therein for receiving the lanyard (370), wherein a gripping surface (390) is disposed on the mirror unit top edge (330) and the mirror unit bottom edge (340);

wherein the housing (200) is disposed on the boat or other vehicle via the mounting bracket (290), wherein the mirror unit posterior surface (320) magnetically connects to the housing anterior surface (210) for securely attaching the removable mirror unit (300) to the housing (200).

2. The system (100) of claim 1, wherein the gripping surface (390) comprises flat grips.

3. The system (100) of claim 1, wherein the gripping surface (390) comprises an indentation adapted to receive a tip of a fingernail.

\* \* \* \* \*